X. ESCHALIER.
PROCESS FOR STRENGTHENING CELLULOSE.
APPLICATION FILED DEC. 6, 1906.
995,852.
Patented June 20, 1911.
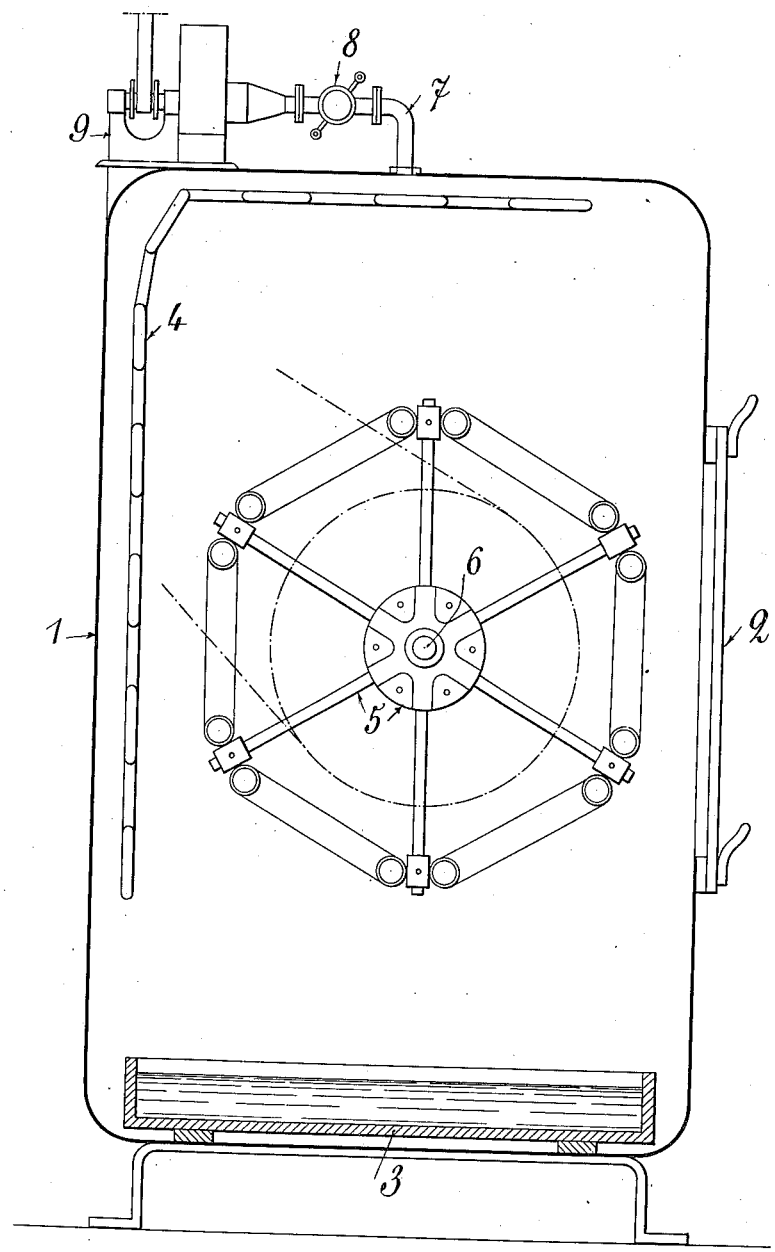
WITNESSES:
W. M. Avery
J. P. Davis
INVENTOR
Xavier Eschalier
BY
Munn & Co
ATTORNEYS

UNITED STATES PATENT OFFICE.

XAVIER ESCHALIER, OF VILLEURBANNE, FRANCE.

PROCESS FOR STRENGTHENING CELLULOSE.

995,852.  Specification of Letters Patent.  Patented June 20, 1911.

Application filed December 6, 1906. Serial No. 346,560.

*To all whom it may concern:*

Be it known that I, XAVIER ESCHALIER, a citizen of the Republic of France, residing at Rue des Fleurs, Villeurbanne, Rhône Department, in the Republic of France, engineer, have invented certain new and useful Improvements in Processes for Strengthening Cellulose, of which the following is a specification.

This invention relates to a process of strengthening solid cellulose bodies, more particularly the depolymerized cellulose bodies in various stages of hydration, produced from solutions in the different solvents. The strengthening of the aforesaid bodies, according to this process, is in the nature of a polymerization or a condensation; its effect being very appreciable in the dry state and especially so in the wet state.

In the case of cellulose filaments the strengthening shows itself in an increased tenacity in the dry state and especially so in the wet state.

The process consists in the action on the above-mentioned bodies, under the hereinafter stated conditions, of aldehydes and aldehyde compounds or their products of polymerization, more especially of formaldehyde or its polymers; ordinary aldehyde compounds and non polymerized aldehydes however have a more effective and more rapid action than their products of polymerization.

The accompanying drawing shows a vertical sectional view of an apparatus for carrying out the process.

The apparatus comprises a receptacle or vessel, 1, closed by a water tight door 2. At the bottom of the receptacle is located a trough 3 containing the sulfuric acid. A heating worm 4 is inclosed within the receptacle, and a reel 5 for receiving the skeins of yarn is mounted on a shaft 6 which is turned or revolved in any suitable manner. The top of the receptacle 1 is connected by a pipe 7 provided with a valve 8, with a fan 9 whereby at the beginning of each operation the greater part of the water vapor given off by the skeins under the influence of heat can be drawn off. After this vapor is expelled or withdrawn, the valve 8 is closed, and the remainder of the water with which the yarns are impregnated is absorbed by the sulfuric acid.

The strengthening of cellulose is effected by the use of aldehydes and bodies containing aldehydes under the following conditions: 1. In an acid medium under the most varied conditions of acidity, that is to say in the presence of acids, or of acid salts or esters. 2. Or in the presence of dehydrating agents. 3. Or, and especially, in the simultaneous presence of acids or acid salts and dehydrating agents, the acids or acid salts or esters being used under the most varied conditions.

The active agents may be employed in the gaseous or in the liquid state, in aqueous solution or in anhydrous solvents, and the treatment may be carried on with or without heat.

The dehydrating agents may, according to circumstances, be dissolved in the liquids containing the aldehydes and the acids constituting the bath for the treatment of the bodies to be strengthened; or they may be placed in closed vessels in the presence of the bodies to be strengthened previously impregnated with aldehydes and acids, and without these dehydrating agents being in immediate contact with the said bodies.

The dehydrating action may, in certain cases, be obtained by the evaporation either of the liquids impregnating the bodies to be strengthened, or of the baths in which the said bodies are immersed, the evaporation being effected by preference in vacuo.

The strengthening effect can in all cases be obtained with or without heat, but the action in the cold is slower, and sometimes takes too long in practice.

When the substances are placed in a receiver in order to be dried, for example in the presence of calcium chlorid, sulfuric acid or other dehydrating agent, it is advantageous to close the receiver in order to avoid currents of air which might carry away part of the aldehyde, as well as to shield the treated substances from the dampness of the outside air; but the receiver should not be hermetically closed. It may for example communicate with the atmosphere by means of a tube connected with a vessel containing a suitable dehydrating agent.

If it is required to strengthen threads or other materials produced from aqueous cellulose solutions, my process can be applied during the manufacture before the drying of the said threads or other materials; in the case of threads from nitrocellulose it may be applied, for instance, before denitration. It must also be understood that the textile filaments (particularly artificial silk, artificial hair, and artificial cotton) can be subjected to the treatment in any form, viz: 1. Thread, twisted or otherwise, in skeins or bobbins, or cops, in beamed warps, etc.; raw, bleached or dyed. 2. Fabrics, pure or mixed, for example: fabrics of pure artificial silk, of pure artificial hair, raw, bleached or dyed, mixed fabrics of artificial silk or hair. 3. Sheets, films, strips, etc.

The following are some examples or methods of applying my process:

Example I: Treatment of cellulose materials in cold or heat by an aldehyde in an acid medium and in the presence of a dehydrating agent, the cellulose materials being impregnated with the aldehyde and acid and placed in the presence of the dehydrating agent but not in actual contact with the latter: The artificial silks or other cellulose materials are impregnated by mordanting with their own weight of the following bath all proportions being in terms of weight:

| | |
|---|---|
| Formaldehyde commercial aqueous solution, 40% | 5 to 25 parts |
| Lactic acid, commercial 80% | 5 to 15 " |
| Water | 90 to 60 " |
| Total | 100   100 |

They are then placed in a closed receiver, in the presence of desiccated or fused calcium chlorid or concentrated sulfuric acid, in sufficient quantity to absorb all the water from the mixture with which the materials have been impregnated. The closed receiver is then first heated for from 4 to 5 hours to raise the temperature of the interior to about 40° to 50° centigrade and is then allowed to cool. The temperature and the duration of the heating may be considerably varied. The operation can even be performed at the ordinary temperature but would take a longer time. It can, on the other hand, be accelerated by making a vacuum in the closed vessel, the elimination of the water being the more speedy as the vacuum is greater. The cellulose materials are afterward washed in water and dried.

Instead of operating as described above, the drying may be started in the cold or at about 30° C. Then heat is applied at 40° to 50° centigrade for 5 to 6 hours and the goods left to cool in the receiver. A more uniform distribution of the reagents over the treated materials is thus obtained, and a more regular action thereby insured. With the same object the skeins of thread, the fabrics or other materials to be treated, may be placed on revolving apparatus that is kept in motion during the whole operation, or at least during the drying.

Example II: In this example, the necessary acid medium is obtained by having recourse to a chemical salt which has an acid reaction, reddening blue litmus. The artificial silks or other materials to be treated are impregnated with about their own weight of the following bath:

| | |
|---|---|
| Formaldehyde commercial solution 40% | 5 to 20 parts |
| Chrome alum or aluminium alum | 5 to 15 parts |
| Water | 90 to 65 parts |
| Total | 100   100 |

Sodium, potassium or ammonium alums may be used. The method of operating and directions are the same as for the preceding example. On coming out of the apparatus the threads or other materials are first washed in acidulated water and then in pure water and dried.

For silks made from nitrated cellulose the best results are obtained with the following bath:

| | |
|---|---|
| Formaldehyde 40% | 10 parts |
| Chrome alum (violet) | 10 " |
| Water | 80 " |
| Total | 100 |

Example III: Very satisfactory results are obtained by combining the two preceding examples in the manner explained in the following new example. The artificial silks or other materials to be treated are impregnated with about their own weight of the following bath:

| | |
|---|---|
| Formaldehyde commercial solution 40% | 5 to 20 parts |
| Aluminium or chrome alum | 2 to 10 " |
| Commercial lactic acid 80% | 2 to 10 " |
| Water | 91 to 60 " |
| Total | 100   100 |

The method of operation and the observations are the same as for the preceding examples.

For viscose silk the best results have been obtained with the following bath:

| | |
|---|---|
| Formaldehyde 40% | 15 parts |
| Ordinary potassium alum | 5 " |
| Lactic acid 80% | 5 " |
| Water | 75 " |
| Total | 100 |

Example IV: Instead of introducing an acid or similar substance at the beginning, it is possible to create the acid medium during the progress of the reaction: for example an oxidizing agent may be added in such quantity as to transform part of the aldehyde into the corresponding acid, in the following manner. The artificial silks or other materials to be treated are impregnated with about their own weight of an aqueous solution of formaldehyde containing 5 to 20% of aldehyde. They are placed in the presence of the dehydrating agent such as concentrated sulfuric acid, chlorid of calcium and the like but without contact with it, in a closed receiver wherein ozone is introduced in such quantity that a part of the formaldehyde is transformed into formic acid. The threads or other materials are left in a cold state until dry. When the ozone has produced its oxidizing effect, heat may be used to hasten the desired strengthening. When concentrated sulfuric acid is employed as a dehydrating agent, the ozone may be produced in the apparatus by introducing barium dioxid into the sulfuric acid.

Other oxidizing agents than ozone may be used. For instance oxygenated water may be employed; in this case the oxygenated water is introduced into the bath which serves to impregnate the yarn.

Example V: Treatment of cellulose material in heat, by an aldehyde in an acid bath serving the purpose of a dehydrating agent. The cellulose materials are immersed in a bath composed of 20 to 25 times their weight of glacial acetic acid, to which are added 2 to 10 thousandths of formaldehyde solution of 40% strength. This bath containing the cellulose materials is heated for 3 to 4 hours to about 90 to 95 degrees centigrade and left to cool. The cellulose materials are then washed in water and dried. In this case, the quantity of formaldehyde should be less for the nitrated cellulose silks than for the silks produced from aqueous solutions.

Examle VI, Treatment without acid:
In the following example paraldehyde has been selected instead of formaldehyde.

Viscose silk is impregnated with about its own weight of paraldehyde, and is then immersed in a solution of chlorid of zinc at 60° Baumé, rendered basic by the addition of oxid of zinc to saturation, it is left for half an hour to cool in the bath, then washed and dried. Silks made from nitrated cellulose would be injured by this treatment.

Example VII, Treatment without a dehydrating agent: Artificial silks produced from nitrated cellulose or from aqueous solutions of cellulose, are impregnated with about their own weight of commercial acetic acid 40% strength, then suspended in a closed receiver above formaldehyde 40% strength and allowed to remain for 8 to 10 days.

The aqueous solution of cellulose is a solution of cellulose in liquids composed of water and suitable substances such as ammoniacal oxid of copper and chlorid of zinc, or solutions of cellulose in the state of xanthate or viscose, in the water.

In the before mentioned formulæ, the threads or other materials to be strengthened are supposed to be impregnated with a quantity of the bath equal to their own weights. But it should be understood that they may also be impregnated with a quantity of the bath less or greater than their weights, and in these cases, the relative proportion of water to the reagents must be reduced or increased.

It is advantageous to use more concentrated baths and to reduce the quantity with which the threads are impregnated, making use, for this purpose, of a hydro extractor or other suitable means in order to obtain a quicker desiccation. Again, instead of water for dissolving the reagents, any other dissolvent without harmful action on the materials to be treated may be used, such as alcohol, acetone, glycerin, sulfuric ether, acetic ether, acetic acid, formic acid, lactic acid, chloroform, tetrachlorid of carbon and sulfid of carbon.

Claims—

1. A process of strengthening solid cellulosic bodies consisting in subjecting the said bodies to the action of an aldehyde, of a substance which reddens litmus and of a dehydrating agent.

2. A process of strengthening, solid cellulosic bodies consisting in subjecting the said bodies to the action of an aldehyde and of a dehydrating agent.

3. A process of strengthening solid cellulosic bodies consisting in subjecting the said bodies to the action of an aldehyde and afterward to the action of a dehydrating agent.

4. A process of strengthening solid cellulosic bodies which consists in subjecting the said bodies to the action of an aldehyde and of a substance which reddens litmus.

5. A process of strengthening solid cellulosic bodies which consists in subjecting the said bodies to the simultaneous action of an aldehyde and of a substance which reddens litmus and subsequently to the action of a dehydrating agent.

In testimony, that I claim the foregoing as my invention, I have signed my name in presence of two subscribing witnesses.

XAVIER ESCHALIER.

Witnesses:
 Thos. N. Browne,
 Marin Viachon.